United States Patent Office.

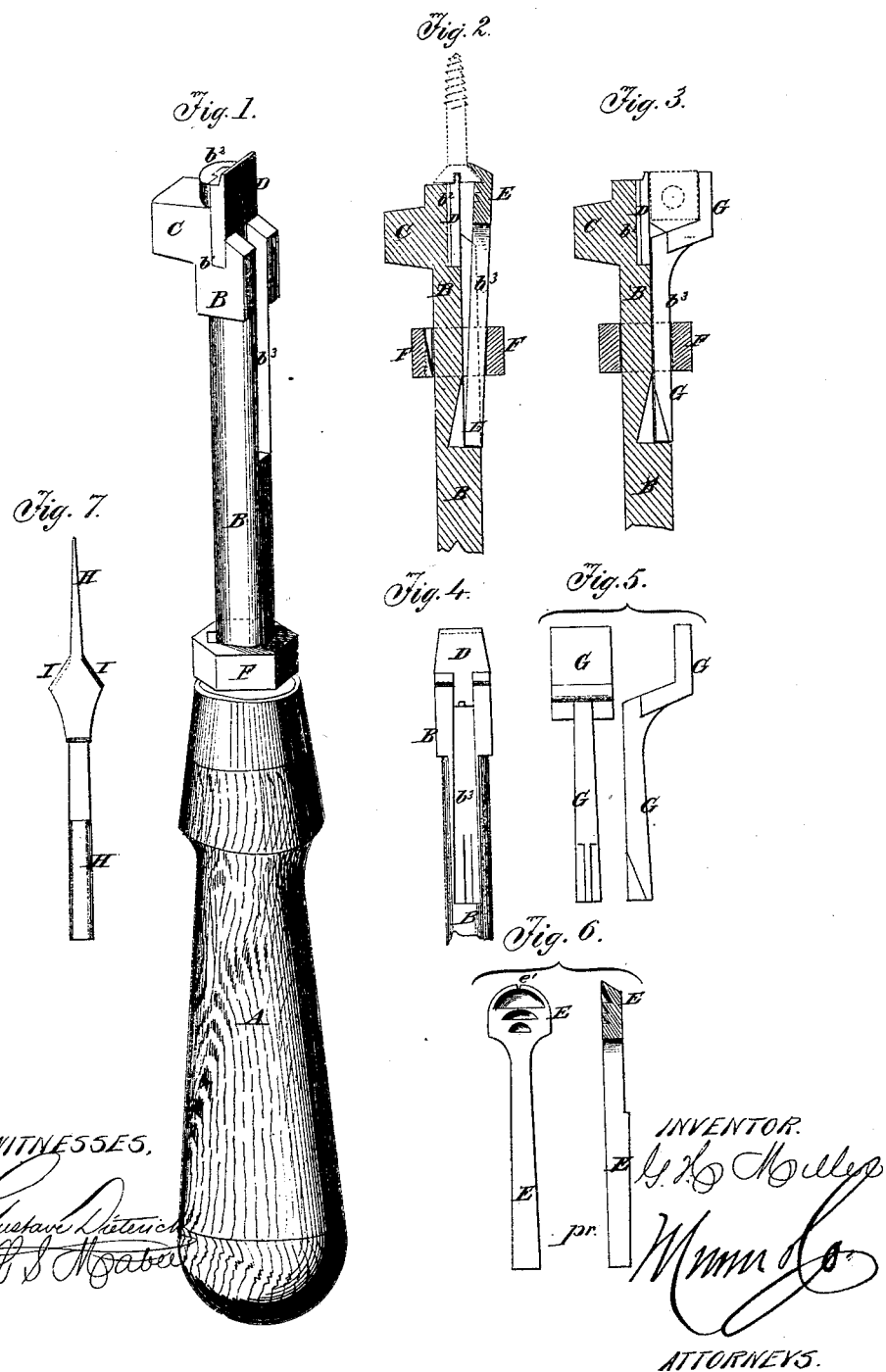

GEORGE H. MILLER, OF DYERSBURG, TENNESSEE.

Letters Patent No. 108,377, dated October 18, 1870.

IMPROVEMENT IN COMBINED TOOLS.

The Schedule referred to in these Letters Patent and making part of the same.

*To all whom it may concern:*

Be it known that I, GEORGE H. MILLER, of Dyersburg, in the county of Dyer and State of Tennessee, have invented a new and useful Improvement in Combined Tool; and I do hereby declare that the following is a full, clear, and exact description thereof, which will enable others skilled in the art to make and use the same, reference being had to the accompanying drawing forming part of this specification, in which—

Figure 1 is a perspective view of my improved tool, adjusted as a simple screw-driver.

Figure 2 is a detail sectional view of the same, illustrating the use of the screw-holding device.

Figure 3 is a detail sectional view of the same, adjusted as a wrench.

Figure 4 is a detail front view of the forward end of the screw-driver.

Figure 5 are detail views of the wrench-attachments.

Figure 6 are detail views of the screw-holding attachment.

Figure 7 is a detail view of the boring-attachment

Similar letters of reference indicate corresponding parts.

My invention has for its object to furnish an improved tool, formed by the combination of various attachments with the shank of a screw-driver to adapt it for use for various purposes; and It consists in the combination of the screw-driver shank and its various attachments, as hereinafter more fully described.

A is the handle of the screw-driver, which I prefer to make hollow, to furnish a convenient receptacle for containing the screw-driver points and other small articles.

To the lower end of the handle A is attached the shank B of the screw-driver, upon one side of the forward end of which shank is formed a projection, C, designed to serve as a hammer-head, for driving tacks and other small nails.

D are small plates or pieces of steel, which serve as points for the screw-driver, and which are inserted in a slat, $b^1$, formed in the forward end of the shank B.

The screw-driver points D have each a dovetailed rib formed upon one side, which fits into a dovetailed groove, $b^2$, formed in the end of the shank B.

By this construction the point D will be securely held, and will, at the same time, be easily detachable, so that it may be conveniently replaced by a larger or smaller one, according to the size of the screws to be operated upon.

The side of the slotted end of the shank B, opposite the hammer-head C, is cut off to form a shoulder, as shown in figs. 1, 2, 3, and 4.

In the side of the shank B, at its forward end, is formed a slot, $b^3$, which is made wider at its lower end, as shown in fig. 4, so as to hold the stems of the devices placed in it, and prevent them from being drawn out by its dovetail form.

The bottom of the slot $b^3$ is made flush with the face or side of the screw-driver points D, as shown in figs. 2 and 3.

E is the clamp for holding the screws while starting them in, said clamp having curved notches formed in its face to fit upon different sized screw-heads, as indicated in dotted lines in fig. 2.

In using the clamp E the point D is inserted in the slot of the screw-head, the clamp E is then adjusted with its proper notch upon the side of the screw-head.

The stem of said clamp is placed in the dovetailed groove $b^3$, and the ring F, upon the shank B, is slipped up, as shown in fig. 2, securing it in place, clamping the screw-head, and enabling it to be conveniently started.

In the forward end of the clamp E is formed a notch, $e$, of such a size and shape as to enable the tool, when the said clamp is secured to the shank B, to be used as a tack-claw G is a device, the stem of which fits into the groove $b^3$ of the shank B, so that it may be secured by the slide F.

The upper end of the piece G is formed as shown in figs. 3 and 5, so as, when the said piece is secured to the shank B, to serve as one jaw of a wrench, the screw-driver point D serving as the other jaw.

To enable the wrench to be adjusted to the size of the nut to be turned, an inclined tenon is formed upon the inner side of the lower end part of its stem, to enter an inclined groove in the lower part of the groove $b^3$, so that the outer end of said piece G may be inclined outward.

To enable it to be secured in this position an inclined notch is formed in the inner surface of the sliding ring, so that, by sliding the said ring up more or less, according to the inclination of the said piece G, said piece may be firmly secured in place.

H is an awl, designed for forming holes to receive the screws, and which has wings I formed upon its side at suitable distance from its point, to serve as countersinks for enlarging the outer ends of the holes to receive the screw-heads.

The stem of the awl H is fitted into the groove $b^3$, and is secured by the slide ring F, in the manner hereinbefore described.

Having thus described my invention,

I claim as new and desire to secure by Letters Patent—

An improved tool, consisting of the handle A, shank B, constructed as described, hammer-head C, detachable screw-driver point D, screw-holder E, piece G, and awl H, said parts being constructed and operating substantially as herein shown and described, and for the purpose set forth.

GEORGE H. MILLER.

Witnesses:
J. S. RICHARDSON,
J. C. PINNER.